US010851908B2

(12) United States Patent
Wheeler

(10) Patent No.: US 10,851,908 B2
(45) Date of Patent: Dec. 1, 2020

(54) FLUID ROUTING DEVICE HAVING A VALVE WITH FIRST AND SECOND PERMANENT MAGNETS

(71) Applicant: Kongsberg Automotive, Inc., Novi, MI (US)

(72) Inventor: Douglas J. Wheeler, Farmington Hills, MI (US)

(73) Assignee: Kongsberg Automotive, Inc., Novi, MI (US)

( * ) Notice: Subject to any disclaimer, the term of this patent is extended or adjusted under 35 U.S.C. 154(b) by 20 days.

(21) Appl. No.: 16/312,074

(22) PCT Filed: Jun. 27, 2017

(86) PCT No.: PCT/US2017/039546
§ 371 (c)(1),
(2) Date: Dec. 20, 2018

(87) PCT Pub. No.: WO2018/005528
PCT Pub. Date: Jan. 4, 2018

(65) Prior Publication Data
US 2019/0226599 A1    Jul. 25, 2019

Related U.S. Application Data

(60) Provisional application No. 62/354,941, filed on Jun. 27, 2016.

(51) Int. Cl.
*F16K 31/08* (2006.01)
*B60N 2/90* (2018.01)
(Continued)

(52) U.S. Cl.
CPC .............. *F16K 31/08* (2013.01); *B60N 2/914* (2018.02); *F16K 11/22* (2013.01); *F16K 11/24* (2013.01);
(Continued)

(58) Field of Classification Search
CPC .... H01F 7/1615; H01F 7/1638; H01F 7/1646; F16K 31/08; F16K 31/082; F16K 31/084; F16K 31/086
See application file for complete search history.

(56) References Cited

U.S. PATENT DOCUMENTS 3,368,788 A    2/1968 Padula
4,350,968 A    9/1982 Tokarz
(Continued)

FOREIGN PATENT DOCUMENTS

CN    2012 93138 Y    8/2009
DE    20 2008 004843 U1    7/2008
(Continued)

OTHER PUBLICATIONS

International Search Report for International Patent Application No. PCT/US2017/039546 dated Sep. 28, 2017; 5 pages.
(Continued)

*Primary Examiner* — Matthew W Jellett
(74) *Attorney, Agent, or Firm* — Howard & Howard Attorneys PLLC

(57) ABSTRACT

A fluid routing device (20) directs the transportation of a fluid. The fluid routing device includes a housing (22) having an opening (40) with a seat (38), and a valve (42) opening and closing the opening. The valve includes a first permanent magnet (56) having a first magnetic coercivity and a first polarity and a second permanent magnet (58) having a second magnetic coercivity lower than the first magnetic coercivity of the first permanent magnet such that the second permanent magnet has a second polarity capable of switching between a complimentary configuration oriented in a common direction as the first polarity, and a reversed configuration oriented in an opposite direction from the first polarity. A coil (59) surrounds at least the second permanent magnet. The coil is configured to orient the
(Continued)

second polarity in the complimentary configuration when electric current passes in a first direction and in the reversed configuration when electric current passes in a second direction.

10 Claims, 14 Drawing Sheets

(51) Int. Cl.

| | | |
|---|---|---|
| *F16K 11/22* | (2006.01) | |
| *F16K 11/24* | (2006.01) | |
| *F16K 27/00* | (2006.01) | |
| *F16K 27/02* | (2006.01) | |
| *F16K 31/06* | (2006.01) | |
| *H01F 7/16* | (2006.01) | |
| *A61H 9/00* | (2006.01) | |

(52) U.S. Cl.
CPC .......... *F16K 27/003* (2013.01); *F16K 27/029* (2013.01); *F16K 27/0263* (2013.01); *F16K 31/0658* (2013.01); *F16K 31/082* (2013.01); *F16K 31/084* (2013.01); *F16K 31/086* (2013.01); *H01F 7/1615* (2013.01); *H01F 7/1638* (2013.01); *H01F 7/1646* (2013.01); *A61H 9/0078* (2013.01); *A61H 2201/0149* (2013.01)

(56) References Cited

U.S. PATENT DOCUMENTS

| | | | | |
|---|---|---|---|---|
| 4,403,765 A | | 9/1983 | Fisher | |
| 4,538,129 A | * | 8/1985 | Fisher | F16K 31/082 |
| | | | | 137/625.65 |
| 4,562,855 A | * | 1/1986 | Cummings | F16K 24/042 |
| | | | | 137/195 |
| 4,630,799 A | * | 12/1986 | Nolan | F16K 31/082 |
| | | | | 137/460 |
| 6,483,688 B1 | | 11/2002 | Jones | |
| 8,833,732 B2 | * | 9/2014 | Heiko | F16K 31/082 |
| | | | | 251/129.15 |
| 9,080,686 B2 | * | 7/2015 | Hoppe | F16K 31/082 |
| 9,970,566 B2 | * | 5/2018 | Rovera | F16K 31/082 |
| 2013/0174914 A1 | * | 7/2013 | McAvey | B67D 7/3218 |
| | | | | 137/2 |

FOREIGN PATENT DOCUMENTS

| | | |
|---|---|---|
| DE | 10 2013 210881 A1 | 12/2014 |
| WO | 2014 135909 A1 | 9/2014 |
| WO | 2015 052194 A1 | 4/2015 |

OTHER PUBLICATIONS

English language abstract, and machine-assisted English language translation of German Reference No. DE 10 2013 210881 A1 extracted from www.espacenet.com on Dec. 13, 2018; 10 pages.

English language abstract, and machine-assisted English language translation of Chinese Reference No. CN 201293138 Y extracted from www.espacenet.com on Dec. 21, 2018; 5 pages.

English language abstract not found; machine-assisted English language translation of German Reference No. DE 20 2008 004843 U1 extracted from www.espacenet.com on Dec. 21, 2018; 7 pages.

English language abstract, and machine-assisted English language translation of WO 2015 052194 A1 extracted from www.espacenet.com on Dec. 21, 2018; 16 pages.

* cited by examiner

US 10,851,908 B2

FLUID ROUTING DEVICE HAVING A VALVE WITH FIRST AND SECOND PERMANENT MAGNETS

CROSS-REFERENCE TO RELATED APPLICATIONS

This application is the National Stage of International Patent Application No. PCT/US2017/039546, filed on Jun. 27, 2017, which claims the benefit of U.S. Provisional Patent Application No. 62/354,941, filed on Jun. 27, 2016, the contents of which are incorporated herein by reference.

BACKGROUND OF THE INVENTION

1. Field of the Invention

A fluid routing device for directing the transportation of a fluid.

2. Description of Related Art

There is a desire within industries implementing fluid transportation to provide for a fluid routing device which can alter the flow path of a fluid. A popular method of altering the flow path of a fluid is through a valve. The valve selectively fluidly couples two fluid cavities through a port. Many techniques have been used to alternate the valve for selectively fluidly coupling the two fluid cavities. One solution in the industry involves a solenoid. The solenoid uses electric current to produce a magnetic field which moves the valve (which is formed of a magnetically permeable material) between an open positions and a closed position. More specifically, the valve is biased toward the closed position. The magnetic field produced by the solenoid moves the valve against the bias to the open position.

Although effective, continuous electrical energy is required to maintain the solenoid in an energized state in order to retain the valve in the open position. Therefore, there remains a need to provide an improved fluid routing device.

SUMMARY OF THE INVENTION

The subject invention provides for a fluid routing device for directing the transportation of a fluid. The fluid routing device includes a housing having an opening with a seat disposed about the opening for selectively transporting the fluid therethrough. The fluid routing device further includes a valve coupled to the housing to selectively open and close the opening of the housing. The valve includes a first permanent magnet extending along a magnet axis between a pair of ends. The first permanent magnet has a first magnetic coercivity and a first polarity that is fixed along the magnet axis. The valve further includes a second permanent magnet extending along the magnet axis between a pair of ends. The second permanent magnet has a second magnetic coercivity lower than the first magnetic coercivity of the first permanent magnet such that the second permanent magnet has a second polarity capable of switching along the magnet axis. More specifically, the second polarity is capable of switching between a complimentary configuration oriented in a common direction as the first polarity of the first permanent magnet, and a reversed configuration oriented in an opposite direction from the first polarity of the first permanent magnet.

The valve further includes a coil surrounding at least the second permanent magnet. The coil comprises an electrically conductive material configured to receive an electric current in one of a first direction and a second direction, opposing the first direction. The coil is configured to orient the second polarity in the complimentary configuration when electric current passes in the first direction and the coil configured to orient the second polarity in the reversed configuration when electric current passes in the second direction.

The valve further includes a plunger movable along a plunger axis between a closed position in which the plunger abuts the seat to close the opening, and an open position in which the plunger is spaced from the seat to open the opening. The plunger is positioned in the closed position when the second polarity of the second permanent magnet is in one of the complimentary and reversed configurations. The plunger is positioned in the open position when the second polarity of the second permanent magnet is in the other one of the complimentary and reversed configurations.

The subject invention provides the advantage of only requiring electric current to change states of the magnetic circuit (i.e., to orient the second polarity of the second permanent magnet), and not to impart electromagnetic force on the plunger to maintain the open and closed positions, which provides the benefit of reduced power consumption.

BRIEF DESCRIPTION OF THE DRAWINGS

Advantages of the subject invention will be readily appreciated as the same becomes better understood by reference to the following detailed description when considered in connection with the accompanying drawings.

DETAILED DESCRIPTION OF THE INVENTION

Figure 1:
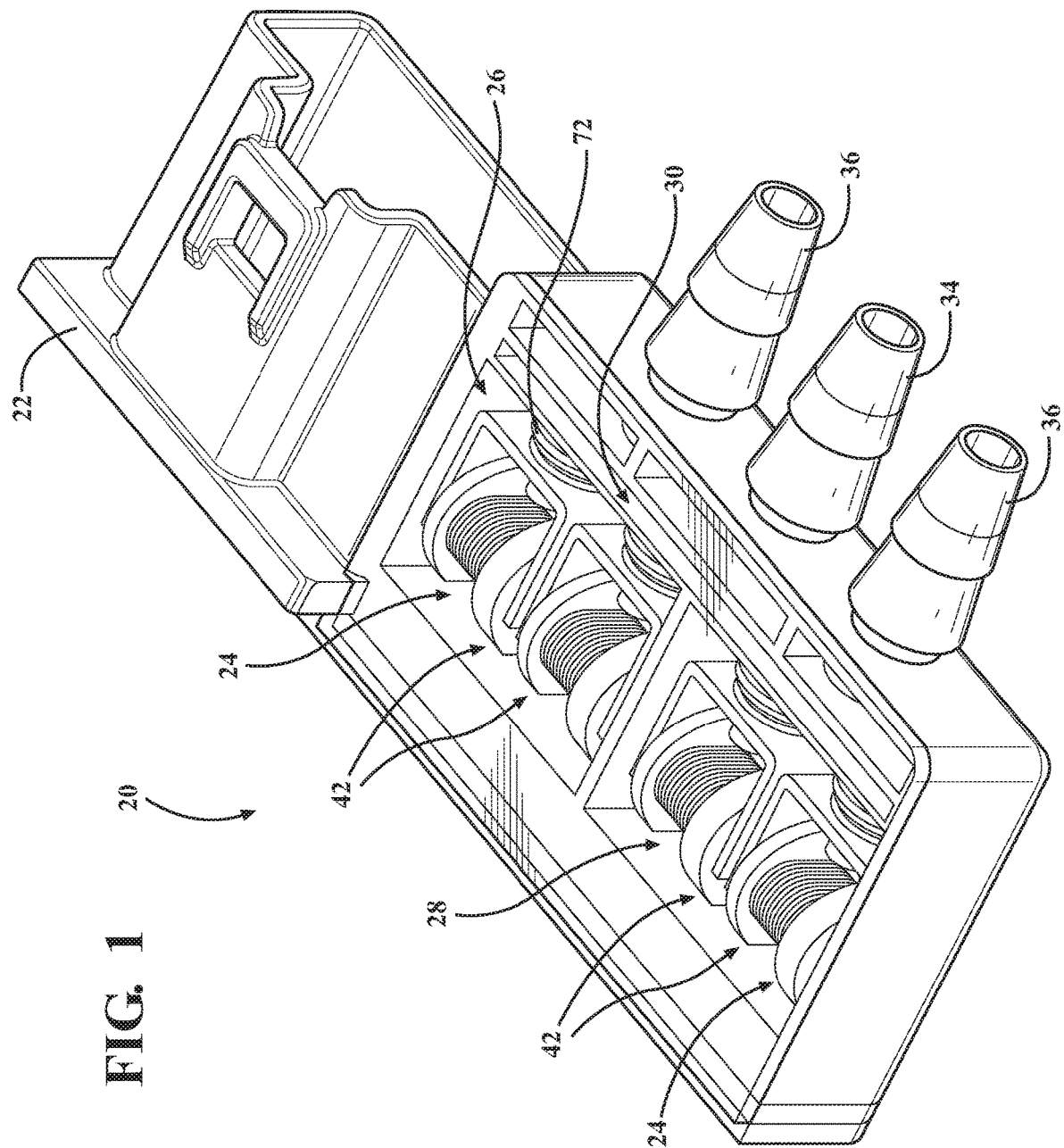
FIG. 1 is a perspective view of a fluid routing device having a plurality of valves.

Referring to the Figures, wherein like numerals indicate like or corresponding parts throughout the several views, a fluid routing device 20 for directing the transportation of a fluid is generally shown in FIG. 1. The fluid routing device 20 is typically disposed within a vehicle for transporting at least one occupant. The vehicle is further defined as a passenger car, a truck, or any other configuration for providing transportation. The vehicle includes at least one seat disposed within the vehicle for supporting the occupant(s) with the seat having a cell capable of inflating and deflating. The fluid routing device 20 typically directs the transportation of the fluid into and out of the cell for inflating and deflating the cell. Inflation and deflation of the cell varies the support given through the seat to the occupant. The fluid is typically a gas. However, it is to be appreciated that the fluid can be a liquid or any other configuration transportable to and from the cell.

It is to be appreciated that application of the fluid routing device 20 is not limited to within the vehicle. Furthermore, the cell is not limited to application within the seat. As such, the fluid routing device 20 can be disposed in any configuration for transporting the fluid to any configuration of the cell.

Figure 2:
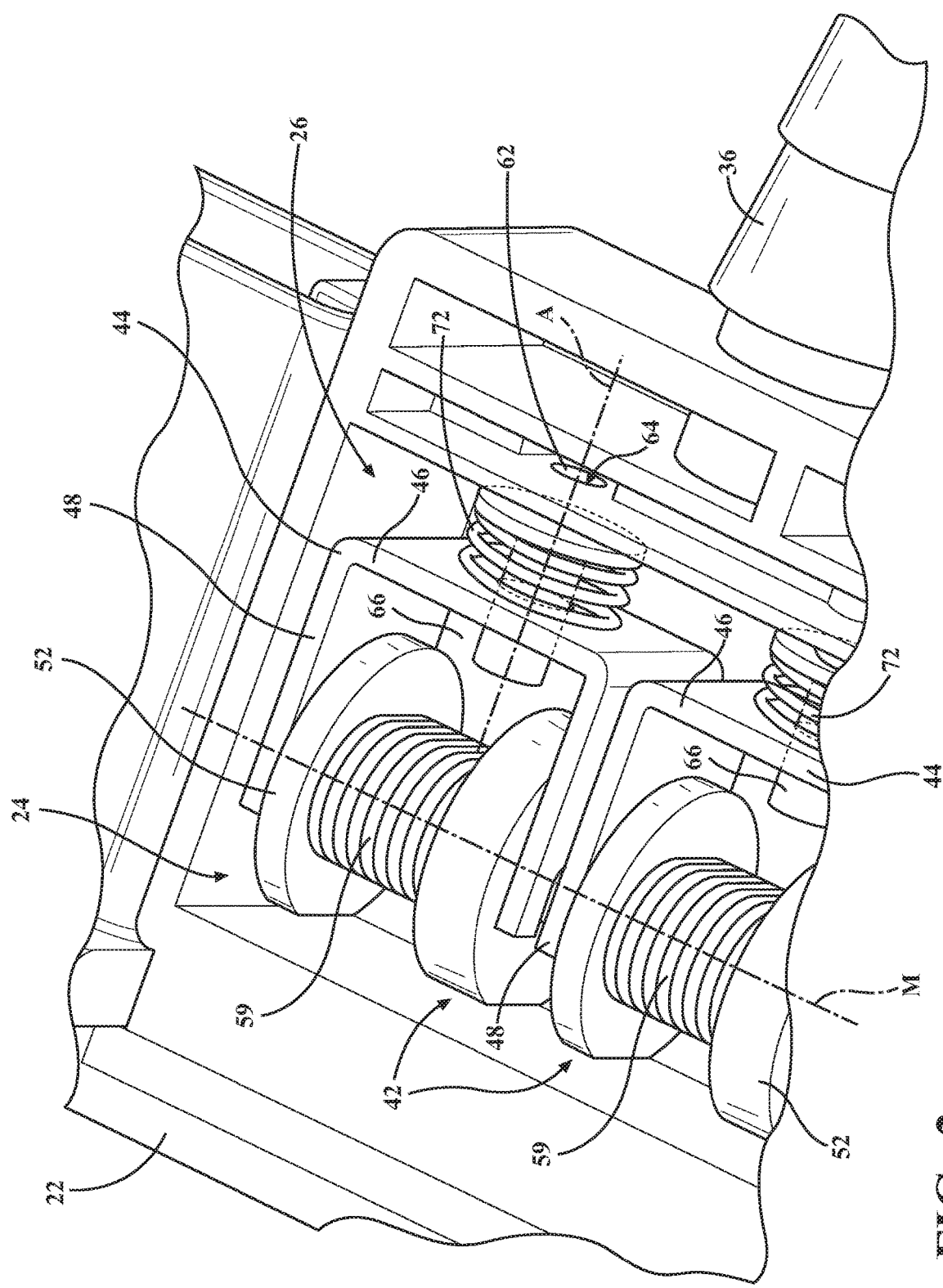
FIG. 2 is a perspective view of a valve including a bobbin, a coil, a plunger, a biasing member, and a frame within an interior of the housing.

As shown in FIGS. 1 and 2, the fluid routing device 20 includes a housing 22. The housing 22 may define an interior 24. The interior 24 may have a first section 26 and a second section 28 fluidly separated from one another; however, one having skill in art will appreciate that the interior 24 may have any number of sections. The housing 22 may further define at least one corridor 30. The housing 22 may include a plurality of nozzles 34, 36. The nozzles 34, 36 may be fluidly coupled with the at least one corridor 30. The nozzles 34, 36 may extend outwardly from the housing 22 substantially parallel to one another.

As shown in FIG. 1, the plurality of nozzles 34, 36 may include at least one inlet nozzle 34 and at least one fill nozzle 36 spaced from each other. The at least one fill nozzle 36 transports air between the cell and the fluid routing device 20 for inflating and deflating the cell. The at least one inlet nozzle 34 draws air into the fluid routing device 20 for inflating the cell. The housing 22 may further define an exhaust port for deflating the cell.

As shown in FIGS. 5, 6, 10, 11 and 13-17, the housing 22 has an opening 40 with a seat 38 disposed about the opening 40 for selectively transporting the fluid therethrough. More specifically, the seat 38 may fluidly couple the at least one corridor 30 and the interior 24 of the housing 22. The opening 40 may be a plurality of openings 40 each fluidly coupling the at least one corridor 30 and the interior 24 of the housing 22. For example, the plurality of openings 40 may be four openings 40, with two of the openings 40 fluidly coupling the at least one corridor 30 with the first section 26 of the interior 24 and with two of the openings 40 fluidly coupling the at least one corridor 30 with the second section 28 of the interior 24.

The at least one corridor 30, plurality of nozzles 34, 36, and the openings 40 as shown in the Figures are schematic in nature. One having skill in the art will appreciate that the at least one corridor 30, plurality of nozzles 34, 36, and the openings 40 may have any suitable configuration for transporting the fluid.

As shown in FIGS. 1, 5, 6, 10, 11, and 13-17, the fluid routing device 20 further includes a valve 42 coupled to the housing 22 to selectively open and close the opening 40 of the housing 22. The valve 42 includes a first permanent magnet 56 extending along a magnet axis M between a pair of ends 57. The first permanent magnet 56 has a first magnetic coercivity and a first polarity that is fixed along the magnet axis M. The valve 42 further includes a second permanent magnet 58 extending along the magnet axis M between a pair of ends 60. The second permanent magnet 58 has a second magnetic coercivity lower than the first magnetic coercivity of the first permanent magnet 56 such that the second permanent magnet 58 has a second polarity capable of switching along the magnet axis M. More specifically, the second polarity is capable of switching between a complimentary configuration oriented in a common direction as the first polarity of the first permanent magnet 56, and a reversed configuration oriented in an opposite direction from the first polarity of the first permanent magnet 56.

The valve 42 further includes a coil 59 surrounding at least the second permanent magnet 58. The coil 59 comprises an electrically conductive material configured to receive an electric current in one of a first direction and a second direction, opposing the first direction. The coil 59 is configured to orient the second polarity in the complimentary configuration when electric current passes in the first direction and the coil 59 configured to orient the second polarity in the reversed configuration when electric current passes in the second direction.

The valve 42 further includes a plunger 66 movable along a plunger axis A between a closed position (as shown in FIGS. 5, 10, 13, 16, and 17) in which the plunger 66 abuts the seat 38 to close the opening 40, and an open position (as shown in FIGS. 6, 11, 14, 15, and 17) in which the plunger 66 is spaced from the seat 38 to open the opening 40. The plunger 66 is positioned in the closed position when the second polarity of the second permanent magnet 58 is in one of the complimentary and reversed configurations. The plunger 66 is positioned in the open position when the second polarity of the second permanent magnet 58 is in the other one of the complimentary and reversed configurations.

The valve 42 may be disposed within the interior 24. The valve 42 may be a plurality of valves 42 disposed within the interior 24. For example, as shown in the Figures, the plurality of valves 42 may be four valves 42, with two of the valves 42 fluidly disposed in the first section 26 of the interior 24 and with two of the valves 42 disposed in the second section 28 of the interior 24. Each of the plurality of valves 42 individually correspond with each of the plurality of openings 40 of the housing 22. One having skill in the art will appreciate that the fluid routing device 20 may have any suitable number of openings 40 and corresponding valves 42.

As shown in FIGS. 3, 4, and 9-11, the first and second permanent magnets 56, 58 may extend parallel to one another along the magnet axis M. The valve 42 may further include a bobbin 52 formed of non-magnetically permeable material. The bobbin 52 may define a bore 54 therethrough. Both of the first and second permanent magnets 56, 58 may extend longitudinally through the bore 54.

As shown in FIGS. 3, 4, 9-11, and 13-17 the bobbin 52 (as well as the first and second permanent magnets 56, 58) is surrounded by the coil 59. The coil 59 is comprised of a single strand of an electrically conductive material (commonly copper, but may be any suitable metallic material) which is wound around the bobbin 52. The coil 59 is electrically coupled to a controller, which is capable of transmitting an electric current through the coil 59.

Figure 3:
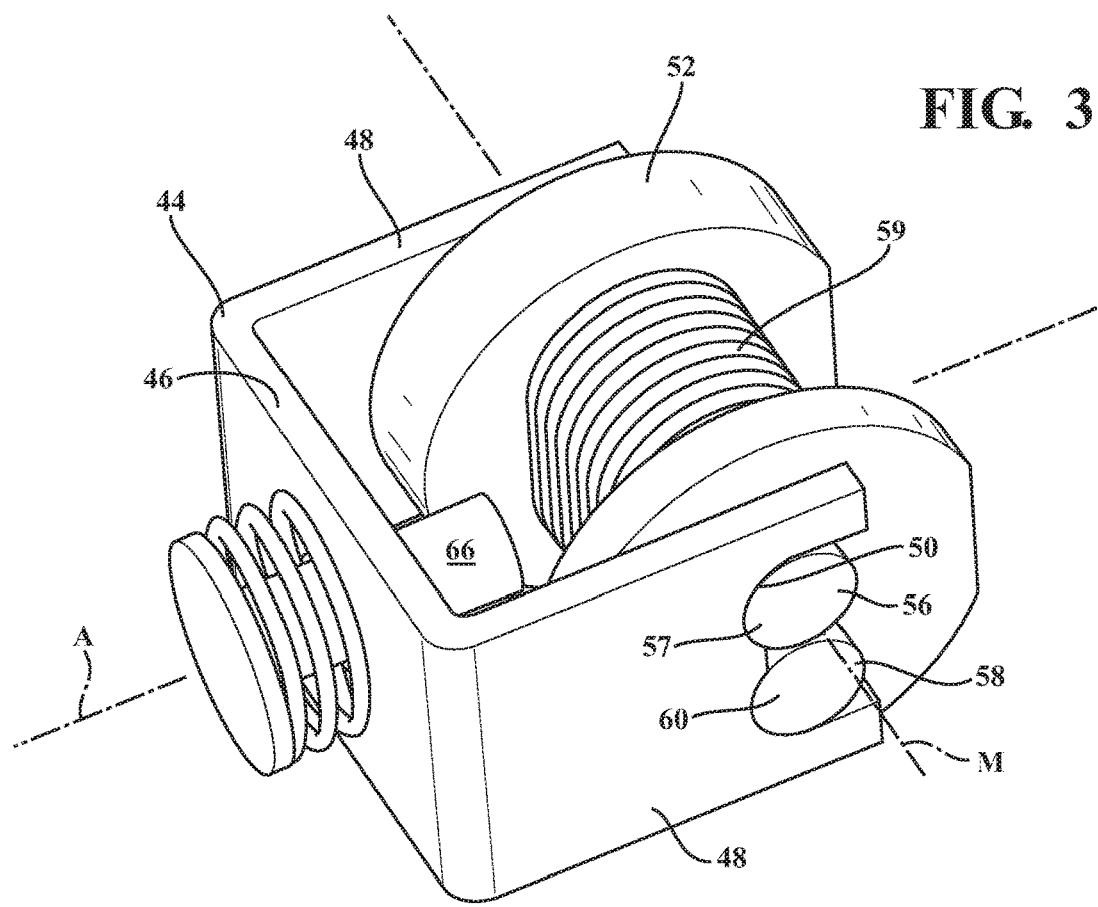
FIG. 3 is a first perspective view of the valve showing first and second permanent magnets parallel to one another.
Figure 4:
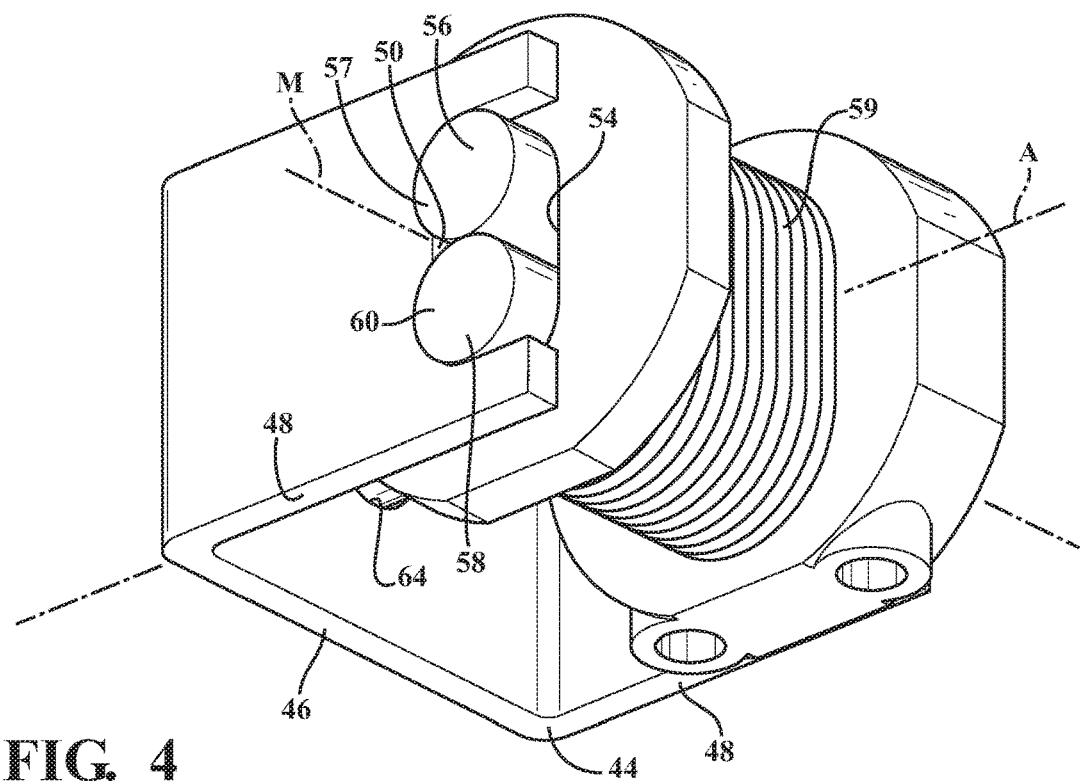
FIG. 4 is a second perspective view of the valve showing the first and second permanent magnets parallel to one another.
Figure 5:
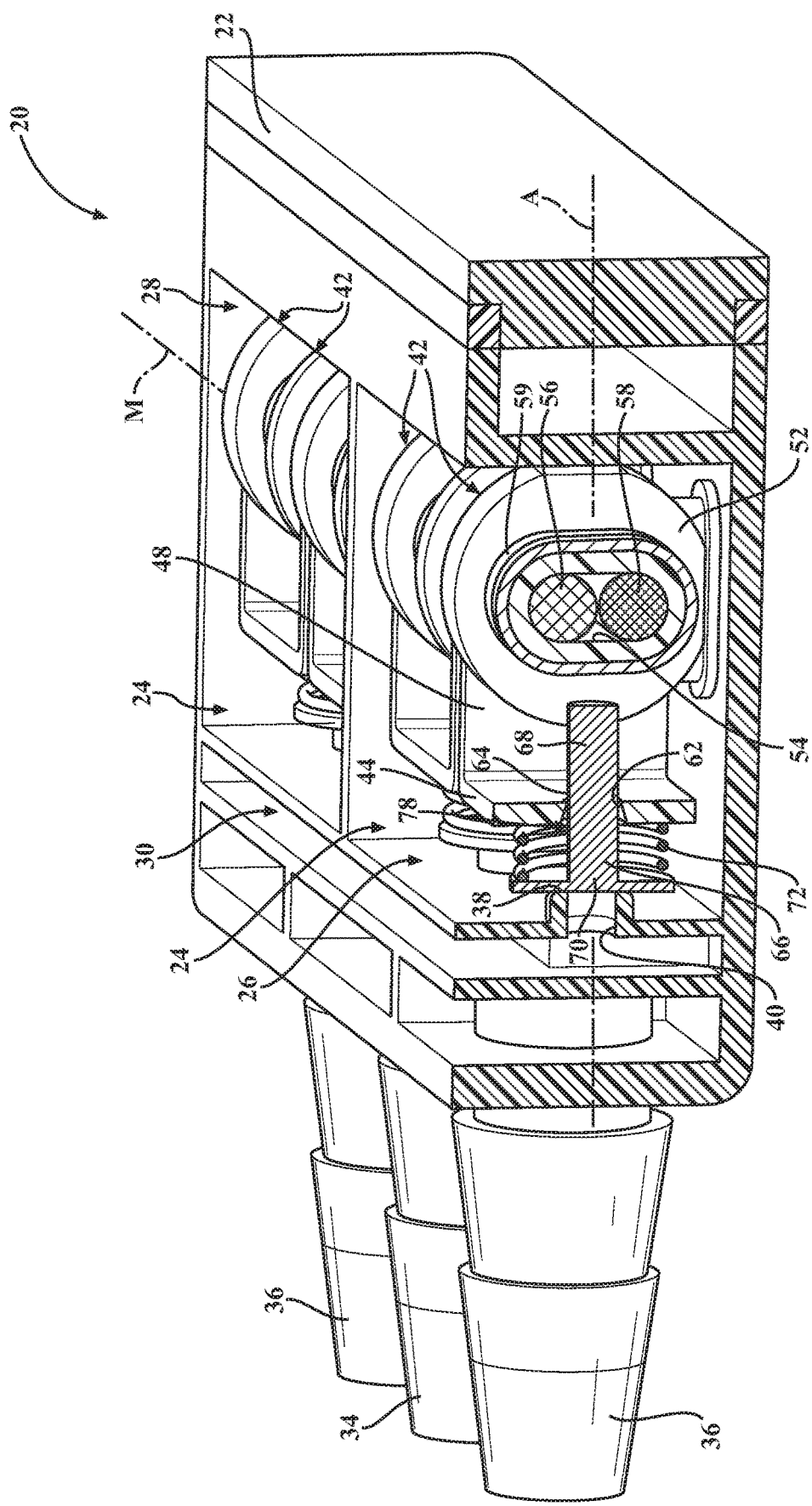
FIG. 5 is a cross-sectional, perspective view of the fluid routing device with the plunger of the valve in a closed position.
Figure 6:
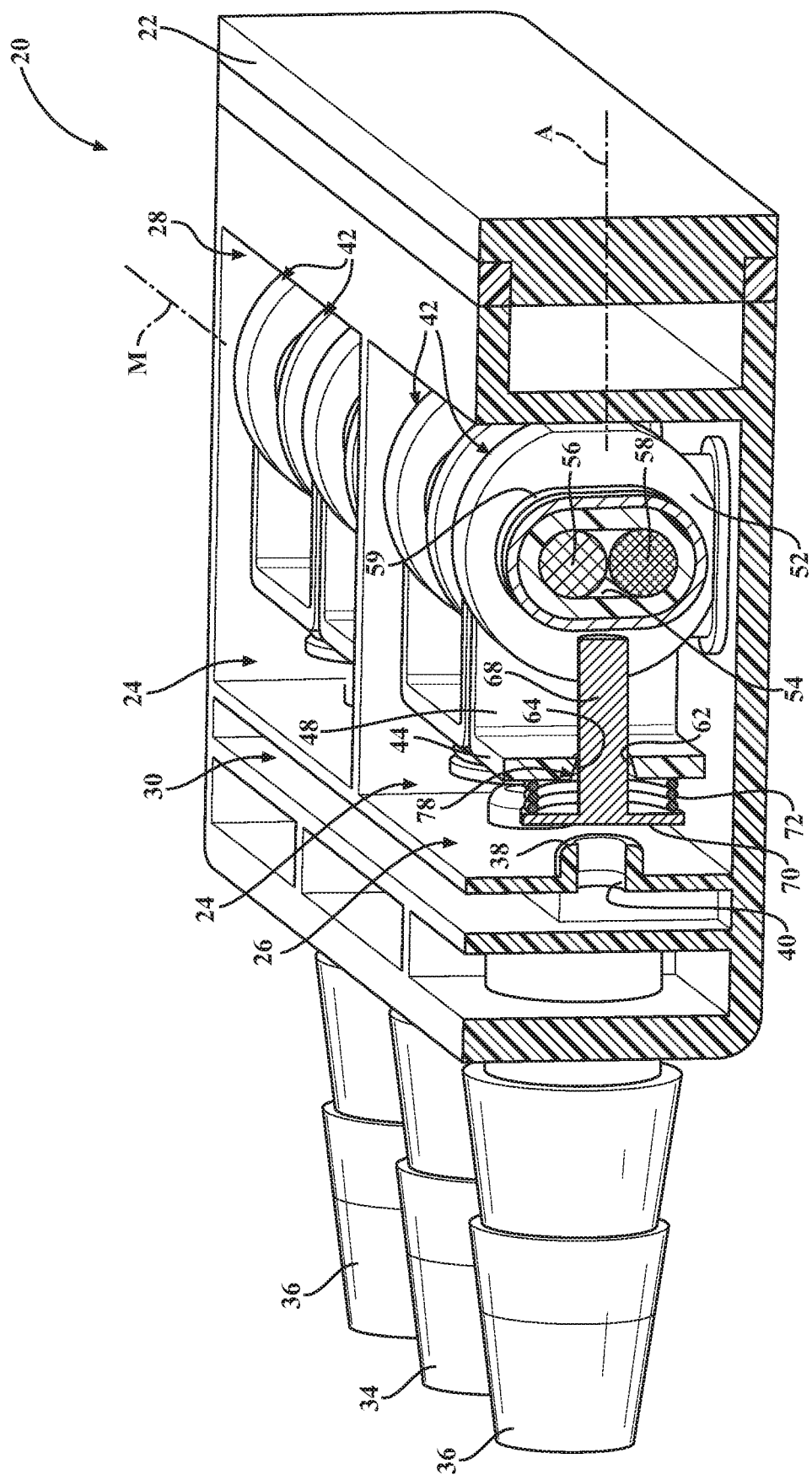
FIG. 6 is a cross-sectional, perspective view of the fluid routing device with the plunger in an open position.
Figure 7:
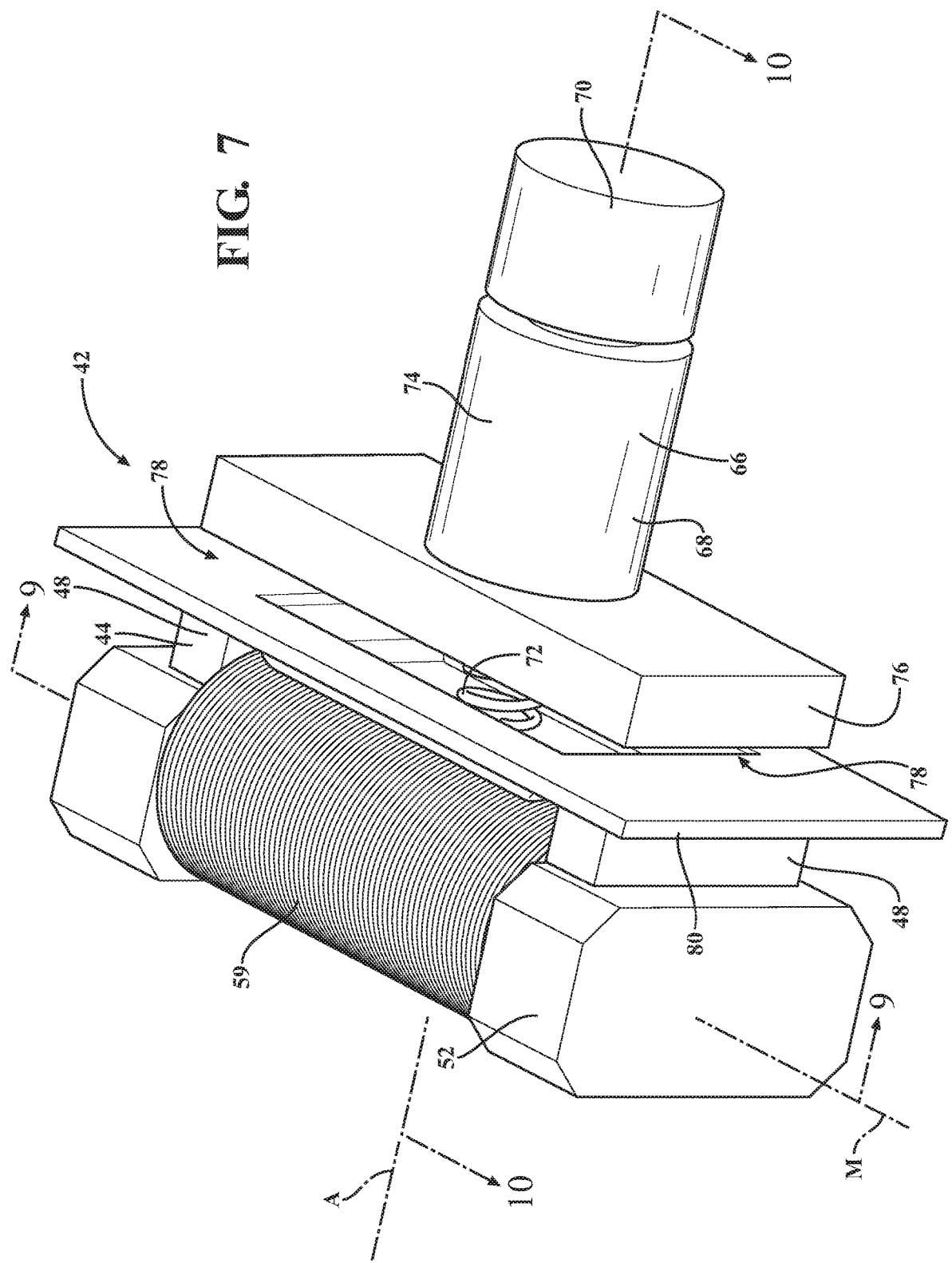
FIG. 7 is a perspective view of the valve, with the plunger having a body and a flange.
Figure 8:
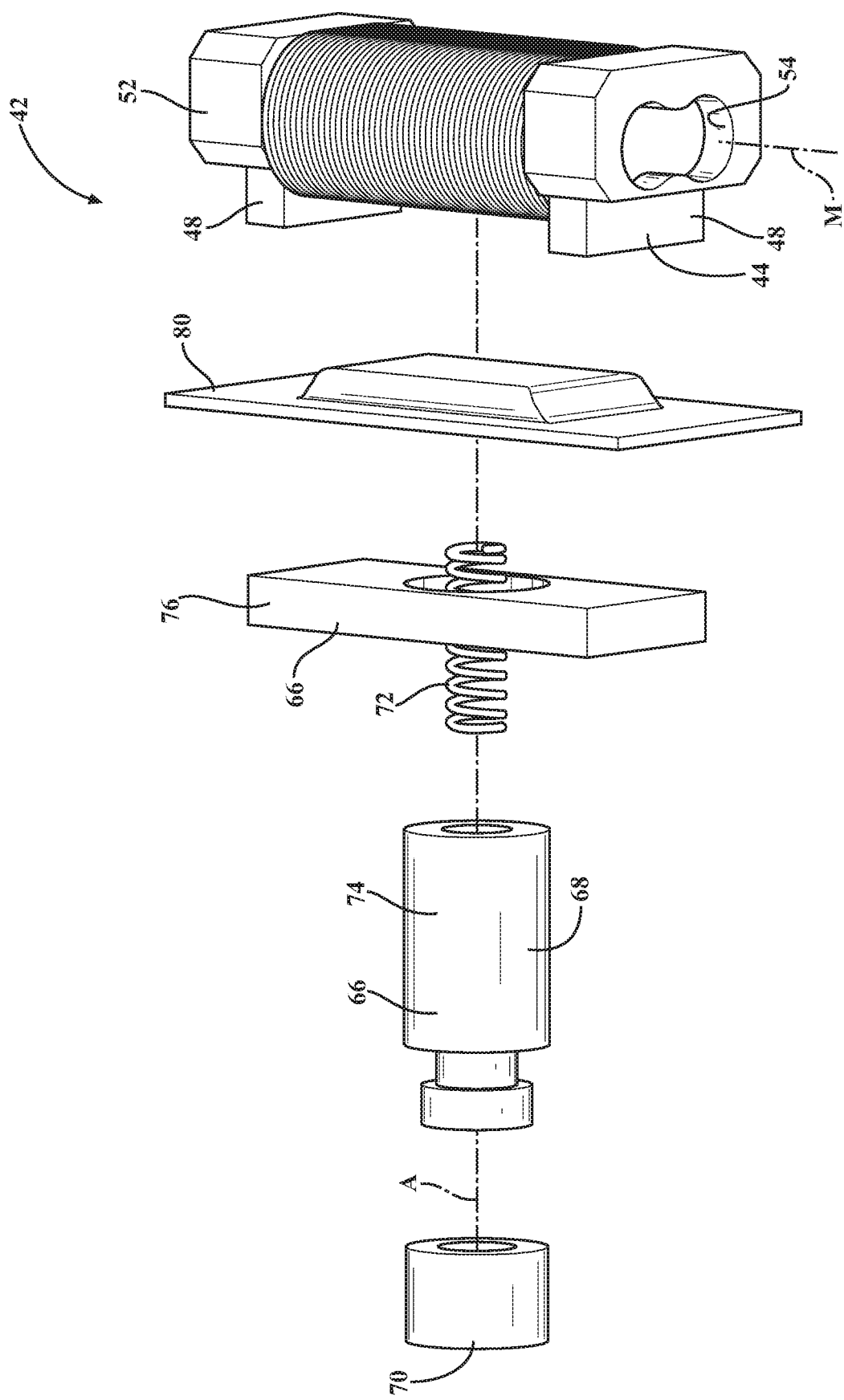
FIG. 8 is an exploded view of the valve shown in FIG. 7.

The first and second permanent magnets 56, 58 may be partially disposed within the bore 54, such that the first and second permanent magnets 56, 58 extend outside the bore 54 at opposing ends. As shown in FIGS. 3 and 4, the valve 42 may include a frame 44. The frame 44 may include pair of legs 48. The legs 48 may extend to an engagement surface 50. The engagement surfaces of the legs 48 may be configured to abut the first and second permanent magnets 56, 58. The abutment of the frame 44 with first and second permanent magnets 56, 58 creates a flux path through the legs 48 of the frame 44 for the magnetic field produced by the first and second permanent magnets 56, 58. Moreover, the frame 44 may be fixed to the first and second permanent magnets 56, 58.

Figure 9:
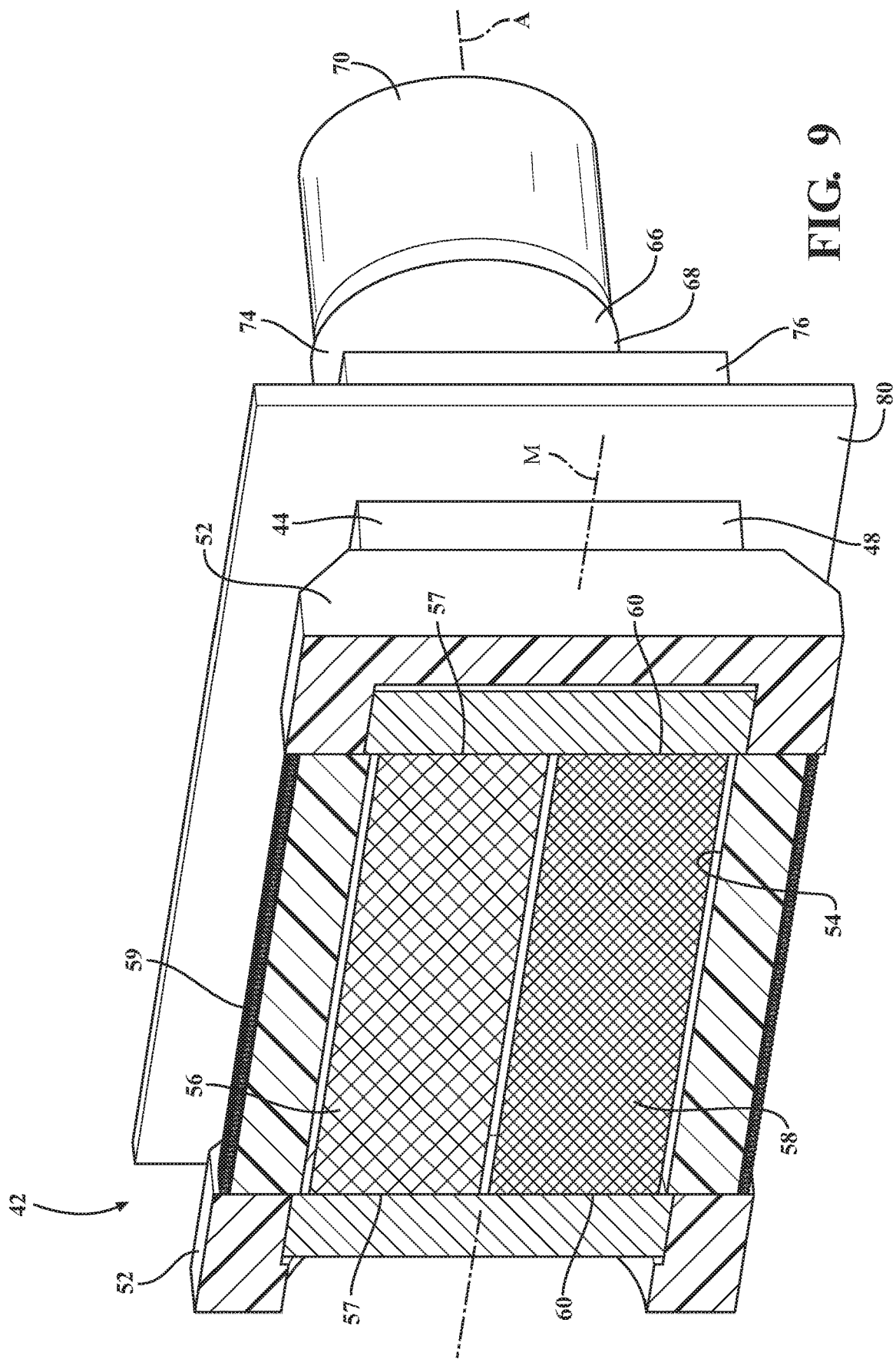
FIG. 9 is a cross-sectional perspective view of the valve shown in FIG. 7.

The frame 44 may be comprised of a magnetically permeable material, such as steel. The frame 44 may abut each of the pair of ends 57, 60 of both of the first and second permanent magnets 56, 58 to partially define flux circuit for the first and second permanent magnets 56, 58. As shown in FIGS. 3, 4, and 9. The frame 44 may include the pair of legs 48 abutting each of the pair of ends 57, 60 of both of the first and second permanent magnets 56, 58 and extending substantially parallel to one another transverse to the magnet axis M. The bobbin 52 may be disposed between the legs 48, with the bore 54 opening toward each of the legs 48.

The plunger 66 may at least partially be comprised of a magnetically permeable material, such as steel. The plunger 66 may be spaced from the frame 44 to define an air gap 78 therebetween, with the frame 44 and the plunger 66 defining the flux circuit across the air gap 78.

More specifically, in one configuration, the valve 42 further includes a plate 46 extending between and coupled with the pair of legs 48, as shown in FIGS. 2-6. The legs 48 may be unitary with the plate 46 (as shown in the Figures), or may be assembled to the plate 46 by welding, bolts, or any other suitable fastening device. Each of the legs 48 may extend from the plate 46 to an engagement surface 50 for abutting the first and second permanent magnets 56, 58. The plate 46 defines a hole 64 along the plunger axis A for accepting the plunger 66 therein. The air gap 78 between the frame 44 and the plunger 66 is defined within the hole 64 between the frame 44 and the plunger 66. More specifically, the plate 46 of the frame 44 may have a hole surface 62 defining the hole 64 along the plunger axis A. The plunger 66 may be movably disposed within the hole 64. The plunger axis A may be substantially parallel with the legs 48. Moreover, the plunger axis A may be substantially perpendicular to the longitudinal orientation of the first and second permanent magnets 56, 58. One having skill in the art will appreciate that the plunger axis A may have any suitable orientation. The hole surface 62 may have a taper. More specifically, the hole surface 62 may be angled such that the hole surface 62 is transverse to the plunger axis A. The taper of the hole surface 62 facilitates the movement of the plunger 66. More specifically, the taper of the hole surface 62 directs the flux path of the first and second permanent magnets 56, 58. Changing the taper of the hole surface 62 alters the amount of magnetic force that the first and second permanent magnets 56, 58 exert on the plunger 66.

In another configuration, the plunger 66 includes a body 74 extending along the plunger axis A and a flange 76 transverse to the body 74 and extending in opposing directions toward the pair of legs 48, with the air gap 78 between the frame 44 and the plunger 66 further defined as a pair of air gaps 78 between the flange 76 and one of the pair of ends of each of the legs 48, as shown in FIGS. 7-11. More specifically, the pair of legs 48 may extend substantially parallel to the plunger axis A and the flange 76 may extend substantially perpendicular to the plunger axis A. The pair of legs 48 may be a common length such that the pair of air gaps 78 are substantially equal. The body 74 and the flange 76 may be a plurality of components coupled to one another by press fit, mechanical fastener, or any other suitable coupling. Alternatively, the body 74 and the flange 76 may be an integral component. The flange 76 may be comprised of a magnetically permeable material, such as steel. Alternatively, both the body 74 and the flange 76 may be comprised of a magnetically permeable material.

As shown in FIGS. 7-11, the valve 42 may further include a diaphragm 80 disposed between the plunger 66 and the frame 44. The diaphragm 80 fluidly separates portions of the housing 22 for directing the flow of the fluid from the opening 40. For example, the diaphragm 80 may fluidly separate the interior 24 of the housing 22. One having skill in the art will appreciate that the diaphragm 80 may fluidly separate any portion of the housing 22.

The plunger 66 may include an elongated portion 68 extending longitudinally along the plunger axis A between a pair of ends, and an abutment portion 70 disposed at one end of the elongated portion 68 and configured to abut the seat 38 about the opening 40 of the housing 22. The elongated portion 68 and the abutment portion 70 may be integral such that the elongated and abutment portions 68, 70 are a unitary component.

The plunger 66 is movable between the closed position and the open position. In the closed position, the plunger 66 abuts the seat 38 and closes the opening 40. The abutment of the plunger 66 with the seat 38 prevents the transportation of fluid between the at least one corridor 30 and the interior 24. In the open position, the plunger 66 is spaced from the seat 38 and opens the opening 40. The spacing of the plunger 66 from the seat 38 permits transport of fluid between the at least one corridor 30 and the interior 24.

The term "permanent magnet" refers to a magnet that retains its magnetic properties in the absence of an inducing field or current. As described above, the second permanent magnet 58 is constructed of a material having a magnetic coercivity (i.e., a measure of the ability of a material to withstand an external magnetic field without becoming demagnetized) which is lower than that of the first permanent magnet 56. As such, the second permanent magnet 58 is capable of switching (reversing) polarity while the first permanent magnet 56 is resistant switching polarity. For example, the second permanent magnet 58 may be an AlNiCo magnet which may be comprised of an alloy of aluminum, nickel, and cobalt. The first permanent magnet 56 may be a neodymium magnet which may be comprised of an alloy of neodymium, iron and boron. One having skill in the art will appreciate that the first and second permanent magnets 56, 58 may be comprised of any suitable magnetic material.

Figure 10:
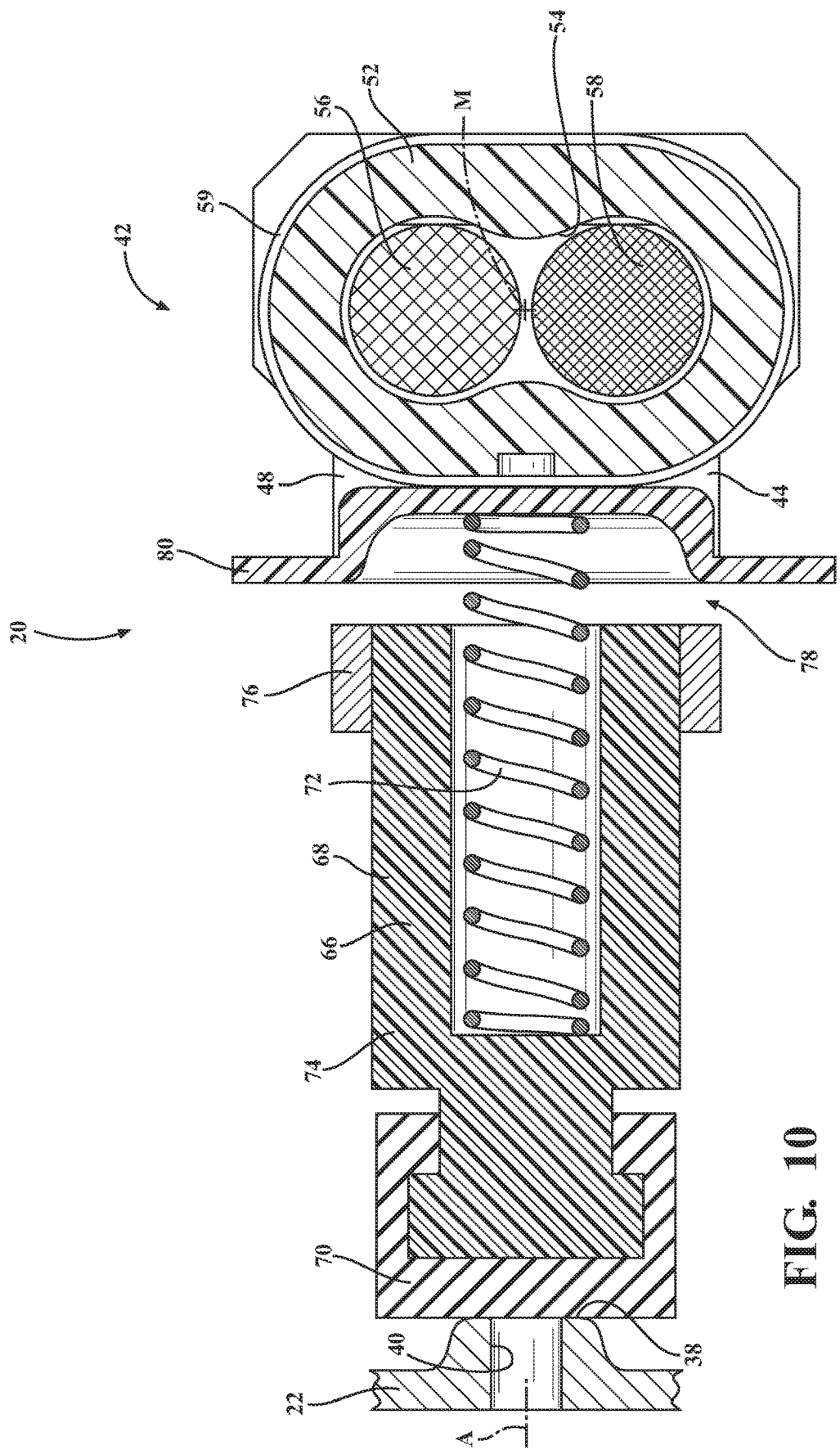
FIG. 10 is cross-sectional view of a fluid routing device having the valve shown in FIG. 7, with plunger in the closed position.
Figure 11:
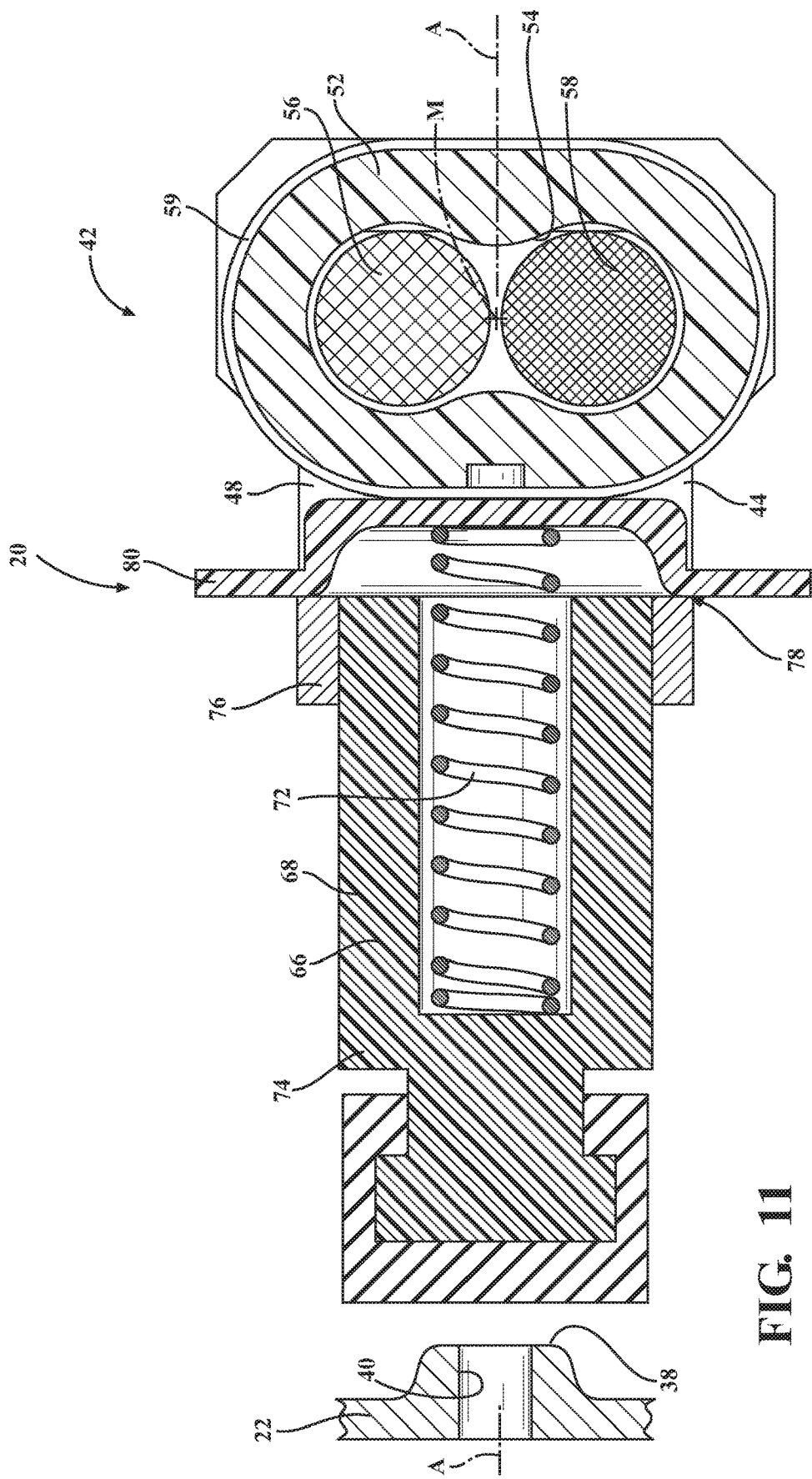
FIG. 11 is cross-sectional view of the fluid routing device having the valve shown in FIG. 7, with plunger in the open position.
Figure 12:
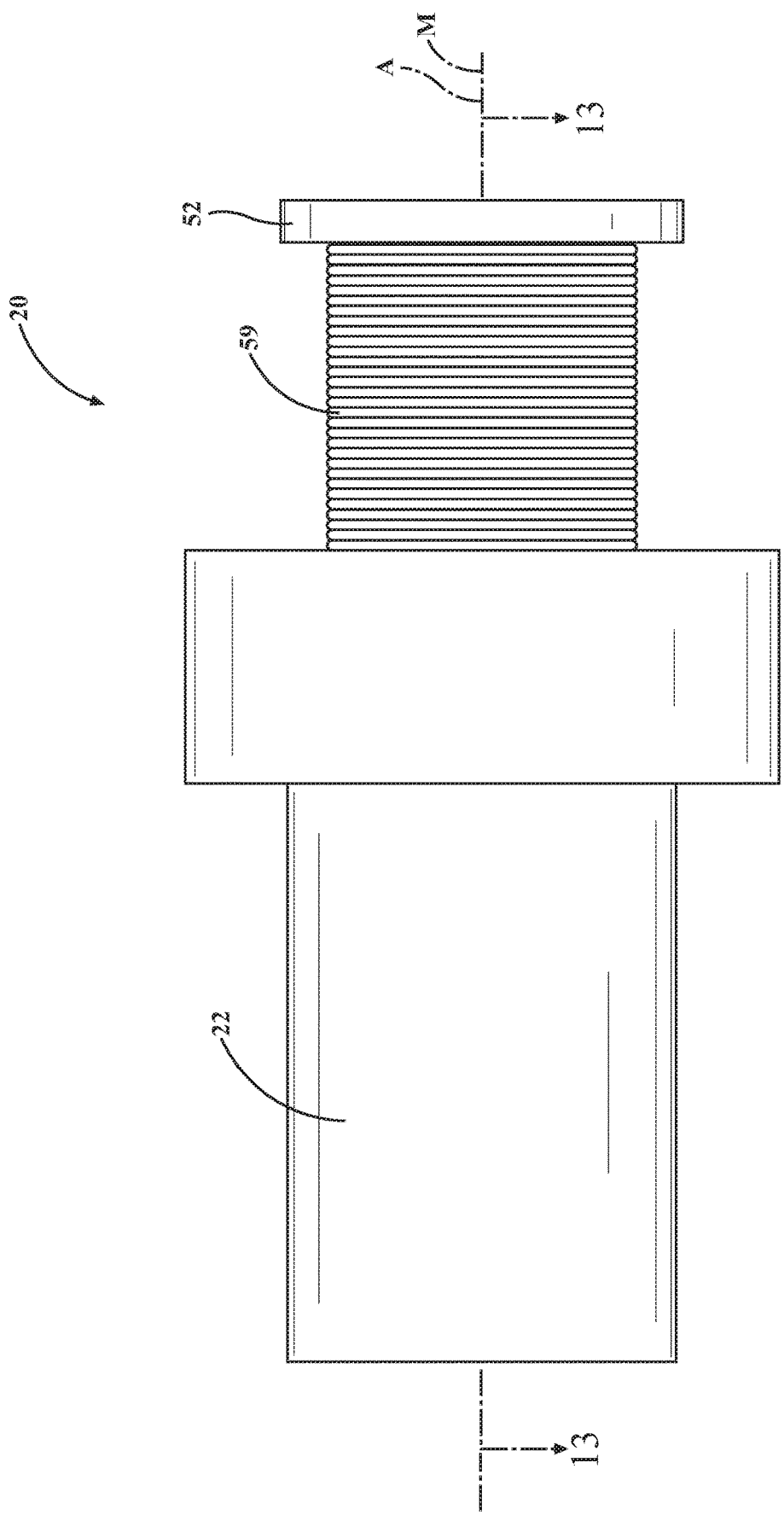
FIG. 12 is an elevational view of another fluid routing device.

The plunger 66 may be disposed in the closed position when the second polarity is in the reversed configuration, with the orientation of the second polarity in the opposite direction from the first polarity of the first permanent magnet 56 resulting in a magnetic flux produced by each of the first and second permanent magnets 56, 58 that substantially cancel out one another. Because the magnetic flux of the first and second permanent magnets 56, 58 substantially cancel out one another, the first and second permanent magnets 56, 58 produce almost no attractive or repulsive force on the plunger 66. The prevent the plunger 66 from freely moving between the open and closed positions, the valve 42 may further include a biasing member 72 engaging the plunger 66 and biasing the plunger 66 to the closed position to retain the plunger 66 in the closed position when the second polarity is in the complimentary configuration. More specifically, as shown in FIGS. 2, 3, 5, and 6, the biasing member 72 may engage each of the plate 46 and the plunger 66 to bias the plunger 66. Alternatively, the biasing member 72 may engage each of the diaphragm 80 and the plunger 66 to bias the plunger 66, as shown in FIGS. 10 and 11. One having skill in the art will appreciate that the biasing member 72 may engage any component opposite the plunger 66 which allows for compression of the biasing member 72.

The plunger 66 may be disposed in the open position when the second polarity is in the complimentary configuration, with the orientation of the second polarity in the common direction as the first polarity of the first permanent magnet 56 resulting in a magnetic flux produced by each of the first and second permanent magnets 56, 58 which compound one another to produce a magnetic field that attracts the plunger 66 toward the permanent magnets. The magnetic field may be great enough to overcome the bias of the biasing member 72 to move the plunger 66 to the open position.

One having skill in the art will appreciate that the opposite may be true. More specifically, the plunger 66 may be disposed in the open position when the second polarity is in the reversed configuration and the plunger 66 may be disposed in the closed configuration when the second polarity is in the complimentary configuration.

Alternatively, the valve 42 may move the plunger 66 between the first and second permanent magnets 56, 58 by attraction and repulsion between the first and second permanent magnets 56, 58. As shown in FIGS. 13-17, the first and second permanent magnets 56, 58 may be linearly aligned along the magnet axis M, with one of the first and second permanent magnets 56, 58 being stationary and the other one of the first and second permanent magnets 56, 58 being movable. Said differently, the first and second permanent magnets 56, 58 may be aligned end to end such that the ends 57, 60 of the magnets face one another.

The plunger 66 may be coupled to the one of the first and second permanent magnets 56, 58 that is movable such that the plunger 66 and the one of the first and second permanent magnets 56, 58 move together as a unit. More specifically, the first permanent magnet 56 may be movable and the second permanent magnet 58 may be stationary, with the plunger 66 fixed with the first permanent magnet 56 such that the plunger 66 and the first permanent magnet 56 move together as a unit. The second permanent magnet 58 may be fixed within the bore 54 of the bobbin 52, with the bobbin 52 fixed to the housing 22. As such, the second permanent magnet 58 may be fixed to the housing 22 and is therefore stationary.

Figure 13:
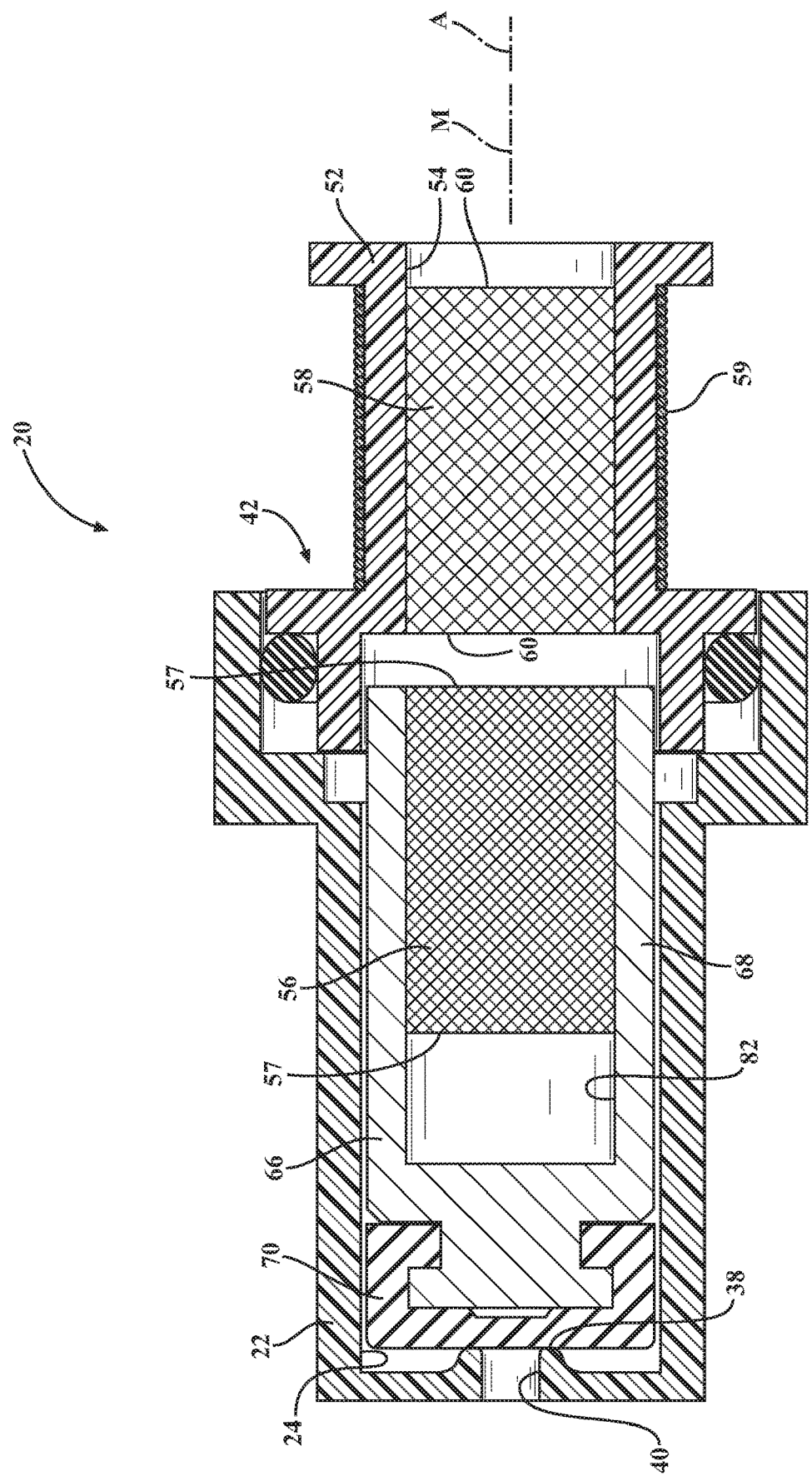
FIG. 13 is a cross-sectional view of the fluid routing device shown in FIG. 12, with the first and second permanent magnets linearly aligned, the first permanent magnet disposed within a cavity of the plunger, and the plunger in the closed position.
Figure 14:
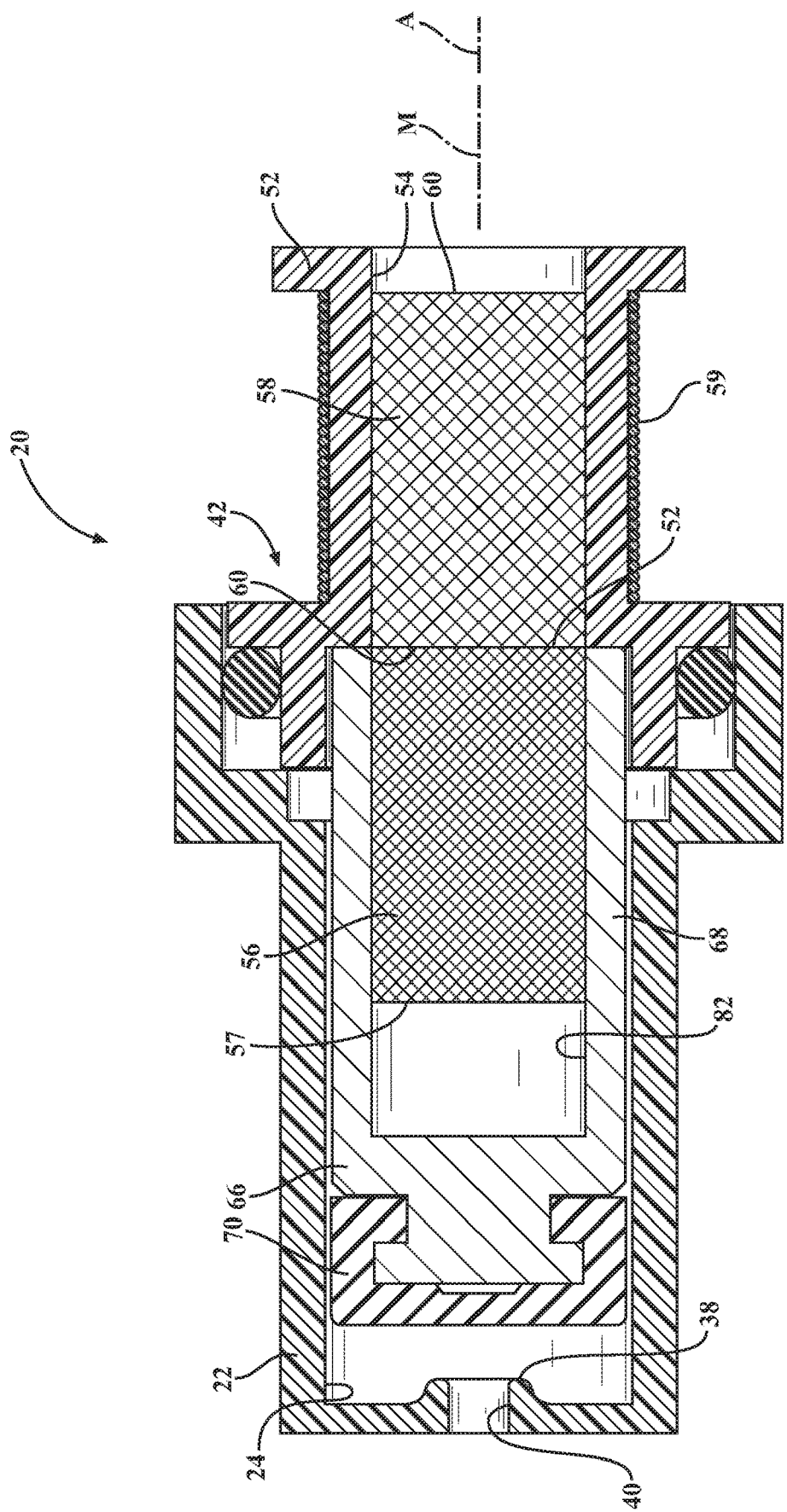
FIG. 14 is a cross-sectional view of the fluid routing device shown in FIG. 12, with the plunger in the open position.
Figure 15:
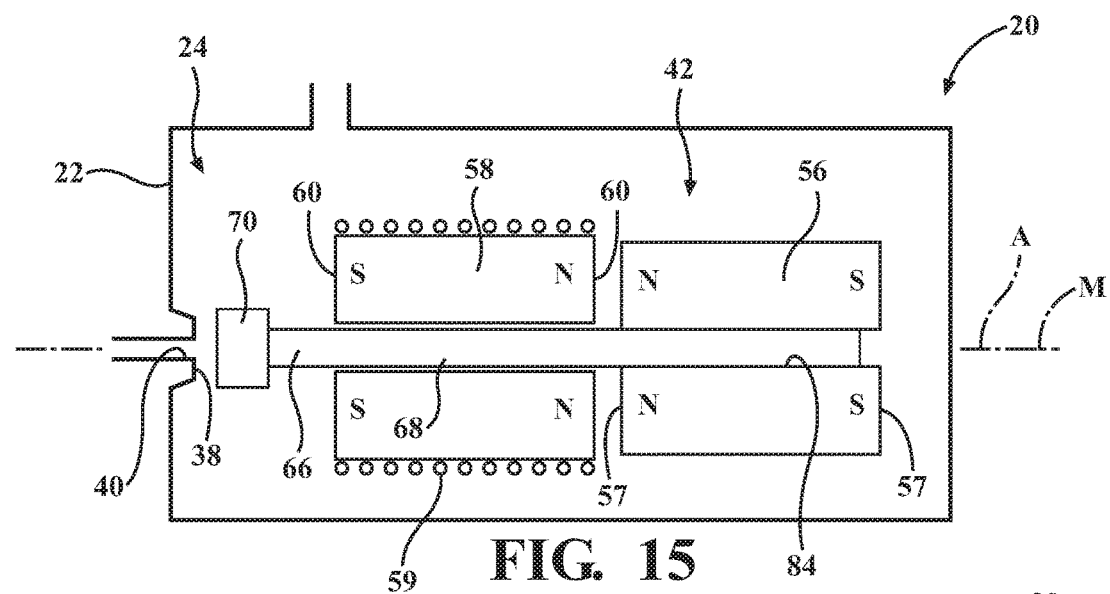
FIG. 15 is a schematic view of the fluid routing device showing the first and second permanent magnets linearly aligned, the plunger disposed within a magnet bore of the first permanent magnet, and the plunger in the open position.
Figure 16:
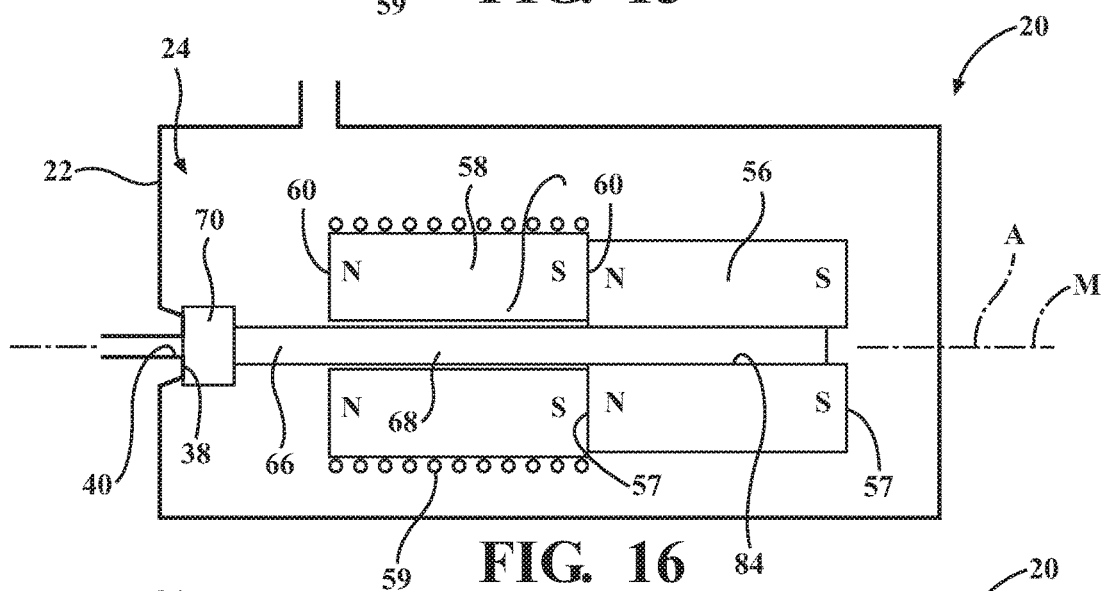
FIG. 16 is a schematic view of the fluid routing device shown in FIG. 15, with the plunger in the open position.
Figure 17:
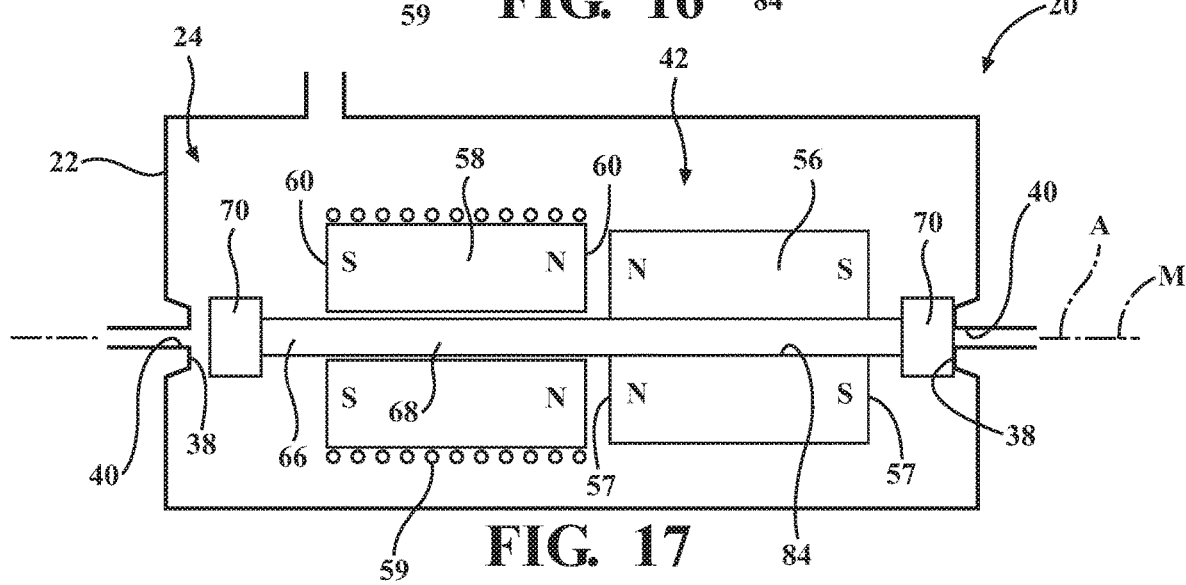
FIG. 17 is a schematic view of the fluid routing device with the housing having a pair of openings and showing the first and second permanent magnets linearly aligned, the plunger disposed within the magnet bore of the first permanent magnet, and with the plunger in the open position relative to one of the pair of openings and the plunger in the closed position relative to the other one of the pair of openings.

The plunger axis A and the magnet axis M may be linearly aligned. As such, the movement of the plunger 66 along the plunger axis A also occurs along the magnet axis M. In one embodiment, the plunger 66 defines a cavity 82 along the plunger axis A, with the first permanent magnet 56 at least partially disposed within the cavity 82 and fixed with the plunger 66, as shown in FIGS. 13 and 14. More specifically, both the cavity 82 and the first permanent magnet 56 may have a cylindrical configuration such that the first permanent magnet 56 may be press fit into the cavity 82 of the plunger 66. In another embodiment, the first permanent magnet 56 defines a magnet bore 84 along the magnet axis M, with the plunger 66 at least partially disposed within the magnet bore 84 and fixed with the first permanent magnet 56, as shown in FIGS. 15-17. More specifically, both the magnet bore 84 and the plunger 66 may have a cylindrical configuration such that the plunger 66 may be press fit into the magnet bore 84 of the first permanent magnet 56. One having skill in the art will appreciate that the plunger 66 and the first permanent magnet 56 may be coupled to one another in any suitable manner and in any suitable configuration.

As shown in FIG. 17, the housing 22 may have a pair of openings 40 aligned with plunger axis A and spaced from one another. In such a configuration, the plunger 66 may be configured such that opposite ends of the plunger 66 may selectively open and close the pair of openings 40. More specifically, when one of the ends of the plunger 66 is in the open position with its respective opening 40, the other end of the plunger 66 is in the closed position with its respective opening 40.

The second polarity having the complimentary configuration oriented in the common direction as the first polarity of the first permanent may facilitate attraction between the first and second permanent magnets 56, 58 and movement of the first permanent magnet 56 toward the second permanent magnet 58. More specifically, with the second polarity oriented in the common direction, the opposing poles of the first and second permanent magnets 56, 58 face one another (i.e., a north pole of one of the permanent magnets faces a south pole of the other one of the permanent magnets). As is well known in the art, opposing poles are attracted to one another. Therefore, the first permanent magnet 56 is attracted to and moves toward the second permanent magnet 58 when the second polarity has the complimentary configuration.

The second polarity having the reversed configuration oriented in the opposite direction from the first polarity of the first permanent magnet 56 may facilitate repulsion between the first and second permanent magnets 56, 58 and movement of the first permanent magnet 56 away from the second permanent magnet 58. More specifically, with the second polarity oriented in the opposite direction, the common poles of the first and second permanent magnets 56, 58 face one another (i.e., a north pole of one of the permanent magnets faces a north pole of the other one of the permanent magnets). As is well known in the art, common poles repel one another. Therefore, the first permanent magnet 56 is attracted to an moves toward the second permanent magnet 58 when the second polarity has the complimentary configuration.

As shown in FIGS. 13-17, the closed position of the plunger 66 may correspond with the second polarity of the second permanent magnet 58 having the reversed configuration and the open position of the plunger 66 corresponds with the second polarity of the second permanent magnet 58 having the complimentary configuration. Alternatively, as shown in FIG. 17, the closed position of the plunger 66 may correspond with the second polarity of the second permanent magnet 58 having the complimentary configuration and the open position of the plunger 66 corresponds with the second polarity of the second permanent magnet 58 having the reversed configuration.

In all of the above embodiments, the second polarity of the second permanent magnet 58 is capable of switching along the magnet axis M between the complimentary configuration and the reversed configuration. Furthermore, in all of the above embodiments, movement of the plunger 66 between the open and closed positions is effectuated by the switching of the second permanent magnet 58.

To transition the second polarity of the second permanent magnet 58 from the reversed configuration to the complimentary configuration, electric current passes in the first direction through the coil 59 which produces a first direction magnetic field that orients the second polarity in the complimentary configuration.

To transition the second polarity of the second permanent magnet 58 from the complimentary configuration to the reversed configuration, electric current passes in the second direction through the coil 59 which produces a second direction magnetic field that orients the second polarity in the complimentary configuration. Once the second permanent magnet 58 transitions to the complimentary configuration or the reversed configuration, the second permanent magnet 58 will maintain the complimentary configuration or the reversed configuration. Thus, electric current may be removed from the coil 59 after the second permanent magnet 58 transitions to the complimentary configuration or the reversed configuration. Therefore, electric current is only needed to transition the second permanent magnet 58, providing the benefit of reducing power consumption needed to maintain the plunger 66 of the valve 42 in either open position or the closed position.

The invention has been described in an illustrative manner, and it is to be understood that the terminology which has been used is intended to be in the nature of words of description rather than of limitation. As is now apparent to those skilled in the art, many modifications and variations of the subject invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A fluid routing device for directing the transportation of a fluid, said fluid routing device comprising:
  a housing having an opening with a seat disposed about said opening for selectively transporting the fluid therethrough; and
  a valve coupled to said housing to selectively open and close said opening of said housing; said valve comprising:
    a first permanent magnet extending between a pair of ends defining a first magnetic axis, with said first permanent magnet having a first magnetic coercivity and a first polarity that is fixed in a direction between said pair of ends;
    a second permanent magnet extending between a pair of ends defining a second magnetic axis, with said second permanent magnet having a second magnetic coercivity lower than said first magnetic coercivity of said first permanent magnet such that said second permanent magnet has a second polarity capable of switching directions between said pair of ends between a complimentary configuration oriented in a common direction as said first polarity of said first permanent magnet, and a reversed configuration oriented in an opposite direction from said first polarity of said first permanent magnet;
    wherein said first and second permanent magnets are adjacent one another with said first and second magnetic axes being coplanar with one another;
    a frame comprised of a magnetically permeable material and defined as a pair of legs extending transverse to said first and second magnetic axes, and each of said pair of legs abutting respective ends of both of said first and second permanent magnets to partially define a flux circuit of said first and second permanent magnets through said pair of legs; and
    a coil surrounding at least said second permanent magnet and comprising an electrically conductive material configured to receive an electric current in one of a first direction and a second direction, opposing said first direction, with said coil configured to orient said second polarity in said complimentary configuration when electric current passes in said first direction and said coil configured to orient said second polarity in said reversed configuration when electric current passes in said second direction; and
    a plunger movable along a plunger axis between a closed position in which said plunger abuts said seat to close said opening, and an open position in which said plunger is spaced from said seat to open said opening, with said plunger positioned in said closed position when said second polarity of said second permanent magnet is in one of said complimentary and reversed configurations, and with said plunger positioned in said open position when said second polarity of said second permanent magnet is in the other one of said complimentary and reversed configurations;
    wherein said plunger is disposed in said open position when said second polarity is in said complimentary configuration, with the orientation of said second polarity in said common direction as said first polarity of said first permanent magnet resulting in a magnetic flux produced by each of said first and second permanent magnets which compound one another to produce a magnetic field that attracts said plunger toward said permanent magnets, and said plunger is disposed in said closed position when said second polarity is in said reversed configuration, with the orientation of said second polarity in said opposite direction from said first polarity of said first permanent magnet resulting in a magnetic flux produced by each of said first and second permanent magnets that substantially cancel out one another.

2. The fluid routing device as set forth in claim 1, wherein said plunger is at least partially comprised of a magnetically permeable material and is spaced from said frame to define an air gap therebetween, with said frame and said plunger defining said flux circuit across said air gap.

3. The fluid routing device as set forth in claim 1, wherein said pair of legs extend substantially parallel to one another.

4. The fluid routing device as set forth in claim 3, wherein said frame is further defined as including a plate extending between and coupled with said pair of legs, with said plate defining a hole along said plunger axis for accepting said plunger therein, and with said air gap between said frame and said plunger defined within said hole between said frame and said plunger.

5. The fluid routing device as set forth in claim 2, wherein said plunger includes a body extending along said plunger axis and a flange transverse to said body and extending in opposing directions toward said pair of legs, with said air gap between said frame and said plunger further defined as a pair of air gaps between said flange and one of said pair of ends of each of said legs.

6. The fluid routing device as set forth in claim 1, wherein said valve further includes a biasing member engaging said plunger, and biasing said plunger to said closed position to retain said plunger in said closed position when said second polarity is in said complimentary configuration.

7. The fluid routing device as set forth in claim 1, wherein said closed position of said plunger corresponds with said second polarity of said second permanent magnet having said reversed configuration and said open position of said plunger corresponds with said second polarity of said second permanent magnet having said complimentary configuration.

8. The fluid routing device as set forth in claim 1, wherein said first permanent magnet is comprised of an alloy of neodymium, iron and boron.

9. The fluid routing device as set forth in claim 1, wherein said second permanent magnet is comprised of an alloy of aluminum, nickel, and cobalt.

10. A valve for use with a housing having an opening with a seat disposed about said opening for selectively transporting a fluid therethrough, with said valve coupled to the housing and selectively opening and closing the opening of the housing; said valve comprising:

a first permanent magnet extending between a pair of ends defining a first magnetic axis, with said first permanent magnet having a first magnetic coercivity and a first polarity that is fixed in a direction between said pair of ends;

a second permanent magnet extending between a pair of ends defining a second magnetic axis, with said second permanent magnet having a second magnetic coercivity lower than said first magnetic coercivity of said first permanent magnet such that said second permanent magnet has a second polarity capable of switching directions between said pair of ends between a complimentary configuration oriented in a common direction as said first polarity of said first permanent magnet, and a reversed configuration oriented in an opposite direction from said first polarity of said first permanent magnet;

wherein said first and second permanent magnets are adjacent one another with said first and second magnetic axes being coplanar with one another;

a frame comprised of a magnetically permeable material and defined as a pair of legs extending transverse to said first and second magnetic axes, and each of said pair of legs abutting respective ends of both of said first and second permanent magnets to partially define a flux circuit of said first and second permanent magnets through said pair of legs;

a coil surrounding at least said second permanent magnet and comprising an electrically conductive material configured to receive an electric current in one of a first direction and a second direction, opposing said first direction, with said coil configured to orient said second polarity in said complimentary configuration when electric current passes in said first direction and said coil configured to orient said second polarity in said reversed configuration when electric current passes in said second direction; and a plunger movable along a plunger axis between a closed position for abutting said plunger with the seat to close the opening, and an open position for spacing said plunger from the seat to open the opening, with said plunger positioned in said closed position when said second polarity of said second permanent magnet is in one of said complimentary and reversed configurations, and with said plunger positioned in said open position when said second polarity of said second permanent magnet is in the other one of said complimentary and reversed configurations;

wherein said plunger is disposed in said open position when said second polarity is in said complimentary configuration, with the orientation of said second polarity in said common direction as said first polarity of said first permanent magnet resulting in a magnetic flux produced by each of said first and second permanent magnets which compound one another to produce a magnetic field that attracts said plunger toward said permanent magnets, and said plunger is disposed in said closed position when said second polarity is in said reversed configuration, with the orientation of said second polarity in said opposite direction from said first polarity of said first permanent magnet resulting in a magnetic flux produced by each of said first and second permanent magnets that substantially cancel out one another.

* * * * *